Figure 1:
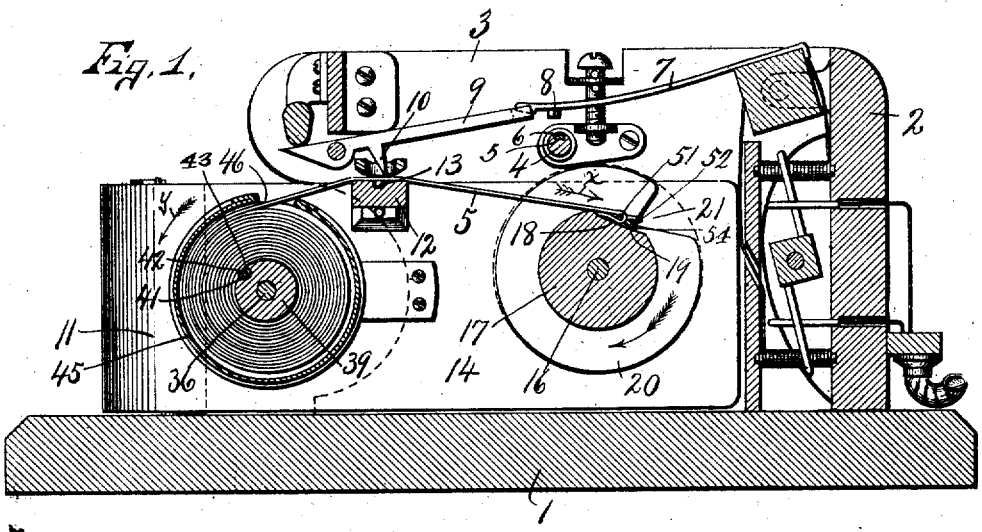

T. B. POWERS.

CONTROLLING MECHANISM FOR SELF PLAYING MUSICAL INSTRUMENTS AND MUSIC ROLLS THEREFOR.

APPLICATION FILED OCT. 17, 1903.

Reissued June 28, 1910. 13,124.

2 SHEETS—SHEET 1.

Witnesses:
J. E. Arthur,
C. E. Chase

Inventor:
Timothy B. Powers
By Howard P. Denison
Attorney.

T. B. POWERS.

CONTROLLING MECHANISM FOR SELF PLAYING MUSICAL INSTRUMENTS AND MUSIC ROLLS THEREFOR.

APPLICATION FILED OCT. 17, 1903.

Reissued June 28, 1910. 13,124.

2 SHEETS—SHEET 2.

Witnesses:
F. E. Arthur,
H. B. Chase

Inventor:
Timothy B. Powers
By Howard P. Denison
Attorney.

UNITED STATES PATENT OFFICE.

TIMOTHY B. POWERS, OF NEW YORK, N. Y., ASSIGNOR, BY MESNE ASSIGNMENTS, TO THE TELELECTRIC COMPANY, OF PITTSFIELD, MASSACHUSETTS, A CORPORATION OF MASSACHUSETTS.

CONTROLLING MECHANISM FOR SELF-PLAYING MUSICAL INSTRUMENTS AND MUSIC-ROLLS THEREFOR.

13,124. Specification of Reissued Letters Patent. Reissued June 28, 1910.

Original No. 682,272, dated September 10, 1901, Serial No. 36,657. Application for reissue filed October 17, 1903. Serial No. 177,508.

*To all whom it may concern:*

Be it known that I, TIMOTHY B. POWERS, a citizen of the United States, residing at New York city, in the county of New York and State of New York, have invented certain new and useful Improvements in Controlling Mechanism for Self-Playing Musical Instruments and Music-Rolls Therefor, fully described and represented in the following specification and accompanying drawings, forming a part of the same.

This invention has reference to improvements in the class of instruments or attachments for playing pianos, organs, or other musical instruments; and the invention relates more particularly to a novel construction of metallic music-sheet which is provided with suitable perforations and its novel arrangement in a metallic or other shell or casing, all of which is to be employed in the manner hereinafter more fully set forth.

The principal object of this invention is to provide a perforated music-sheet or roll made entirely of metal; preferably sheet-brass, which can be reeled upon and from the winding rolls of the apparatus and which sheet is not subject to the varying conditions of the weather, especially dampness, which causes the perforated paper sheets heretofore used to swell or buckle, whereby the contact making parts of the contact-making apparatus are thrown out of alinement with the perforations in the music-sheet or roll, whereas in the metallic music-sheet the perforations are at all times and under varying conditions of temperature and weather in direct alinement with the contact making parts of the contact making and breaking apparatus with which my present invention is to be employed.

A further object of this invention is to provide, in combination with a music-sheet or roll, a metal or other suitable shell or casing in which the music-sheet or roll is operatively arranged, such shell or casing being extremely simple in its construction, durable in operation, inexpensive in its manufacture, and provides a great protection to the perforated music-sheet or roll.

Other objects of this invention will be evident from the following specification.

This invention consists of the novel construction of music-sheet holder or casing hereinafter set forth and in the several novel arrangements and combinations of the parts thereof with the perforated music-sheet, all of which will be fully described in the following specification and then finally embodied in the claims which form a part of this specification.

My present invention is adapted for use in connection with any forms and constructions of contact making and breaking apparatus, such as are employed in connection with the playing keys of a piano, organ, or other key-board musical instrument, or, in fact, with any other kind of musical instrument. In the present case, however, my invention is illustrated in connection with the apparatus described and shown in my reissue Patent No. 12845, dated Aug. 25, 1908.

This invention is clearly illustrated in the accompanying drawings, in which—

Figure 2:
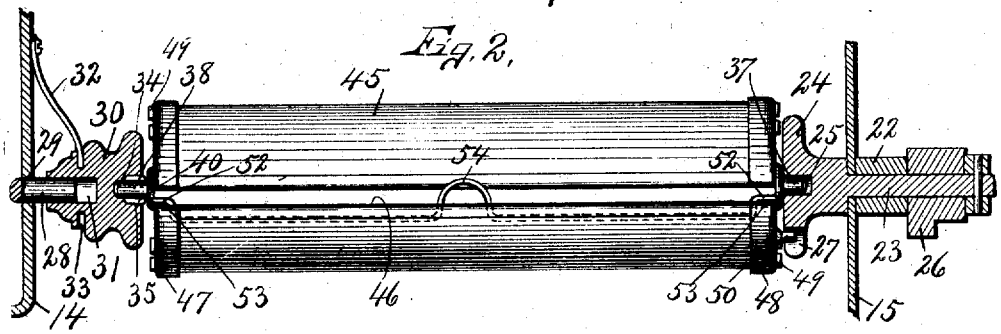
Figure 3:
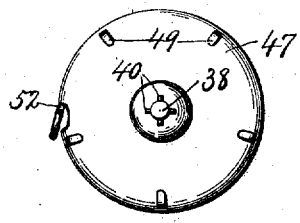
Figure 4:
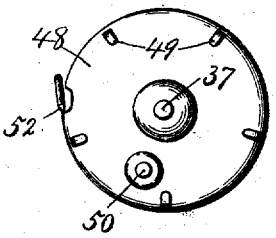
Figure 9:
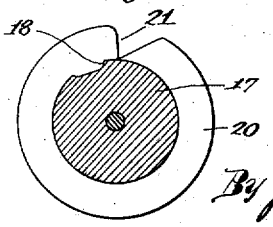
Figure 5:
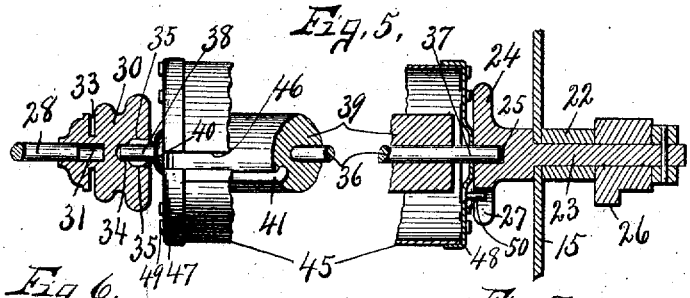
Figure 6:
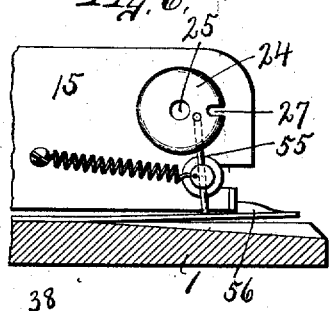
Figure 7:
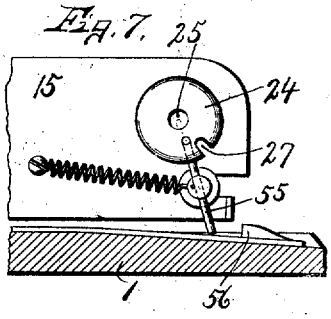
Figure 8:
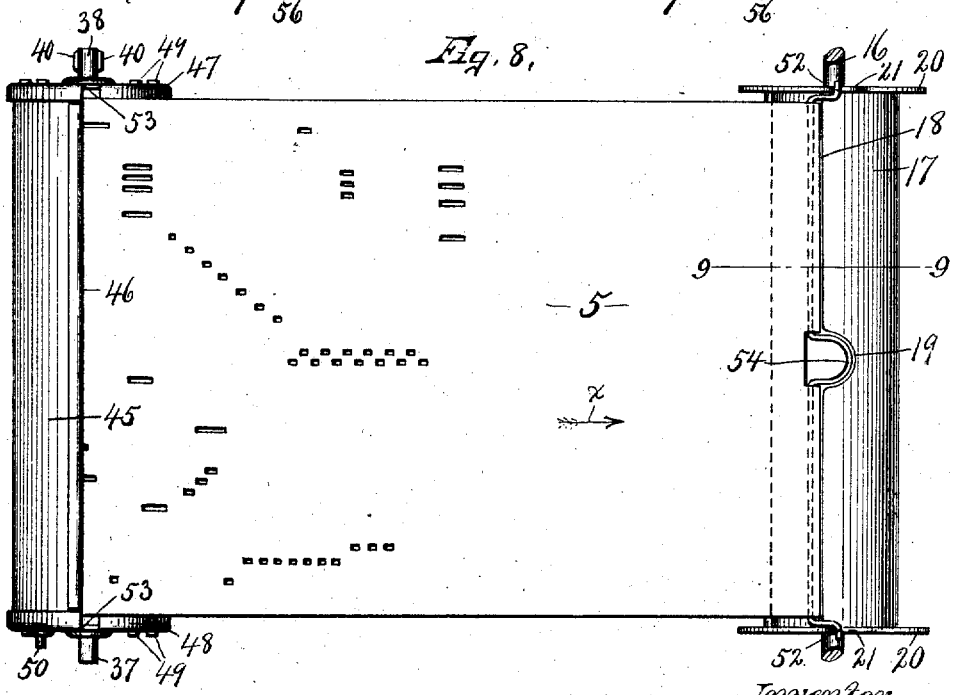

Figure 1 is a vertical representation of the metallic and perforated music-sheet or roll and the holder therefor, both of which embody the principles of this invention. Fig. 2 is a top plan view of the holder with the music-sheet reeled upon the roll or cylindrical body in the holder, said roll being arranged in the bearings of the carriage of the apparatus, the said bearings and portions of the frame of the carriage being represented in horizontal section. Figs. 3 and 4 are the two end views of the shell or casing containing the music-sheet or roll. Fig. 5 is a view representing the two end portions of the shell or casing and portion of a spindle or stem and roll upon which the perforated music-sheet is to be reeled or arranged, said view illustrating also in horizontal section the two bearings connected with the frame of the carriage and in which bearings the same roller is detachably arranged and revolves with one of said bearings when operated from a shaft or spindle on which one of the said bearings is arranged. Figs. 6 and 7 are detail views of a portion of the carriage frame, and portions of a releasing means which is actuated by a partial movement of the bearing in which the one end of the spindle for carrying the shell or casing is arranged. Fig. 8 is a plan view of the perforated music-sheet or roll, the shell or casing, and the roller of the carriage of the apparatus upon which the sheet is to be reeled during the playing of the instrument, said view representing the music-sheet partly withdrawn from the shell or casing, and having its free end attached to the winding roll of the apparatus for reeling the sheet upon said roll. Fig. 9 is a detail sectional view on line 9 of Fig. 8.

Similar numerals of reference are employed in all of the views to indicate corresponding parts.

The general construction of the contact making and breaking device is such that electrical contact is not made through the perforations in the music-sheet, whereby a non-covered metallic and perforated music-sheet having both surfaces exposed can be employed through the perforations of which points of certain spring actuated or other selectors are passed from time to time and whereby other contact fingers are caused to be lowered upon and make electrical contact with a contact-rod in the electric circuit or circuits with which the key actuating magnets are electrically connected. In Fig. 1 of the drawings, these features are indicated in a general way, the numeral —1— referring to the base, —2— indicating the back wall, and —3— one of the sides or frame-pieces of the automatic music playing device. The supporting rod is indicated by the numeral —4—, and it is provided with a slot or groove, in which is arranged a contact bar 6—.

In Fig. 1 I have shown one of the contact making fingers —7— preferably made of spring wire and provided upon its under surface with a contact piece or point —8—, adapted to make electrical contact with the upper surface of the bar —6— when a finger or point 10— on the arm —9— enters a perforation in the music-sheet. The carriage which is provided with a suitable means for feeding the perforated music-sheet beneath the fingers or points —10— of the several arms —9—, is indicated by the numeral —11. The sides of said carriage are connected by means of a cross-bar 12, provided with suitably spaced holes or depressions 13, which correspond in number to the number of fingers 10— on the arms —9— and the contact pieces or points —8— of the fingers —7—. The two sides of the carriage are indicated by the numerals 14— and 15. Rotatably arranged in suitable bearings in the said sides 14— and 15— is a spindle —16—, upon which is secured a wooden or other suitable roller 17. This roller is provided in its cylindrical surface with a groove —18— and an enlarged depression —19—, and at its ends the roller is provided with flanges 20, which form guides, between which the perforated music-sheet is reeled upon the said roller. In each flange —20— is a slot or cut-away part 21— for the purpose hereinafter fully set forth. The said side 15— of the carriage —11— is provided at or near its forward end portion with a bearing —22—, in which is rotatively arranged a stem —23—. This stem has arranged against the inner surface of the side 15— an enlarged portion —24—, which is provided with a central receiving socket 25, forming a suitable bearing for the purpose to be presently set forth. Upon the outer end portion of said stem is suitably secured a catch-plate 26, which is for the purpose previously described in my reissue patent hereinabove mentioned. The said enlarged portion —24— is also provided in its edge with a slot or cut-away part —27—. In the other side —14— of the carriage 11— and in alinement with the bearing in the opposite side 15— is a stem or spindle —28—, which is rotatively arranged in a bearing 29— in the side 14—. The free end of said spindle or stem —28— is arranged in a receiving socket 31— in a bearing —30—, as clearly illustrated. This bearing —30— is held away from the inner surface of the side 14— of the carriage 11— by a flat spring —32—, one end of which is secured to the inner surface of the side 14— and the other end of the spring being operatively fitted in a groove —33— of said bearing 30, substantially as shown. The said bearing —30— is provided with a second receiving socket —34— and a pair of slotted portions 35. It will thus be seen that when the bearing —30— is forced in a direction toward the inner surface of the side 14— the respective ends 37— and 38— of a rod —36— can be arranged in said receiving sockets —25— and —34— of the respective bearings and retained in place by the action of the said spring —32—. This rod or stem —36, which is provided with a central cylindrical body 39, upon which the music-sheet is reeled, has its one end —37— rotatively arranged in the receiving socket 25— in the portion 24; but the opposite end —38— of the rod —36— is not capable of a rotative motion in the socket —34— of the bearing —30—, being prevented from turning by an arrangement of oppositely projecting fins or extensions 40, which fit into slots or grooves 35. Thus it will be understood that when the bearing —30— revolves the stem 36— and parts connected therewith will likewise revolve. As clearly illustrated in Figs. 1 and 5 of the drawings, the said cylindrical body 39— is provided with a longitudinally extending groove or slot 41, which is quite narrow at its open portion in the cylindrical surface of the body 39. Into this groove or slot 41— is slipped from either end of the cylindrical body 39 a rod 42, to which has been previously attached the inner end 43— of a metallic and perforated music-sheet 5. The rod 42— is held in said groove or slot 41, and the main portion or body of the music-sheet is wound upon the said cylindrical body 39. The same is then incased in a shell or casing 45, preferably made of metal, which is formed with a longitudinal opening 46, and is provided with end pieces or caps —47— and 48. These end pieces or caps are secured to the main body of the shell or casing by means of lugs or tongues 49—, which are formed at the edges of said body and after being passed through slots in said end pieces are bent over thereon to hold said end pieces or caps in position. Each end piece or cap is provided with a centrally arranged hole or perforation, through which the respective ends of the stem or rod —36— project for arranging the music-sheet in its movable position within the normally fixed or stationary shell or casing 45. The end piece or cap 48— is provided with a suitably disposed projection or stud 50, which when the shell or casing —45— and its sheet —5— have been arranged between the oppositely-placed bearings of the carriage 11— will extend into the slot or cut-away part 27, and thereby prevent any rotary motion of said shell or casing 45 while the music-sheet is being unreeled from the cylindrical body 39 through the opening 46— in said shell or casing.

In order that the music-sheet may be unreeled from the body 39 by the operating mechanism connected with the stem or spindle —16, to which the receiving roll —17— is secured and onto which the music-sheet is to be reeled, the forward end portion of the music-sheet which has previously been held in position within the casing 45— by the ends 52 of a rod or bar 51, connected with the forward end of the sheet —5— coming in engagement with slots 53 in the respective end pieces or caps 47 and 48, is pulled forward by means of a finger-piece or loop 54, and the said ends 52 of the rod or bar are hooked in the slots or cut-away parts 21— of the flanges 20— substantially as shown. The said ends 52 of the rod or bar 51 are preferably bent at right angles, or approximately so, as illustrated, whereby when said ends 52 are hooked or arranged in the slots of the said flanges —20— the main portion of the rod 51 and the doubled over end of the music-sheet, which is secured around said rod or bar, will lie within the slot 18— and the loop or finger-piece 54— will rest in the depression 19, as clearly illustrated in Fig. 1 of the drawings. These parts, therefore, will not project beyond the peripheral surface of the roller —17— and will not present any obstruction to the other portions of the music-sheet while being reeled upon the said roller —17— The music-sheet is reeled upon the said roller —17— in the direction of the arrow —*x*—, and when the music-sheet has been wound upon said roller —17— and nearly unreeled from the cylindrical body 39 and it is desired to rewind the sheet upon said body 39 this is accomplished by automatically or otherwise throwing off the power from the spindle or stem —16— and applying the power directly to the stem or spindle —28, with which the rod or stem —36— and its parts are connected by means of the bearing 30, as hereinabove set forth. These parts are then caused to revolve in the direction of the arrow —*y*— in Fig. 1, whereby the sheet is unreeled from the roller —17— and rewound upon the cylindrical body 39 within the shell or casing 45. When the music-sheet is nearly rewound, the ends 52 of the rod 51 will slip from the slots 21 in the flanges 20 of said roller 17 and will catch in the slots 53 in the respective end pieces or caps 47 and 48 of the shell or casing 45. The sheet —5— is now wound up tightly within said shell or casing 45, and its direction of rotation still being that indicated by the arrow —*y* the tendency of the shell or casing 45 will be to revolve in the same direction, and a partial rotation of the said shell or casing 45 is the actual result. This partial rotation of the shell or casing —45— will cause the active engagement of the stud or projection 50— in the slot —27— with the part 24, whereby said part 24 will move from the position indicated in Fig. 6 to that represented in Fig. 7. This movement causes a rod or stem 55, which is pivotally connected with the part 24, as illustrated, to depress a spring-stop —56— and release the carriage 11—. At the same time the stem or spindle is disconnected from the driving means. The shell or casing containing the perforated music-sheet can now be removed from the bearings and replaced by another shell or casing containing a differently perrorated music sheet.

It will be understood that changes may be made in the several arrangements and combinations of the various parts, as well as in the details of the construction thereof, without departing from the scope of my present invention and that the music-sheet and the shell or casing comprising my present invention may be used with any kind of contact making and breaking apparatus and any kind of carriage contained in such apparatus. Hence I do not limit myself to the exact arrangements and combinations of the parts as herein described, and illustrated in the accompanying drawings, nor do I confine myself to the exact details of the construction of any of such parts.

Having thus described my invention what I claim and desire to secure by Letters Patent is—

1. In an attachment for playing pianos, organs, or other musical instruments, the combination, with a shell or casing, provided with a longitudinal opening or slot, perforated end pieces or caps, and means rotatably arranged in said shell or casing, of a perforated music sheet or roll on said means, said music sheet having its forward end projecting from the longitudinal opening or slot in said shell or casing, and means at the forward end of said music sheet, adapted to be brought in holding engagement with a portion or portions of said shell or casing, substantially as and for the purposes set forth.

2. In an attachment for playing pianos, organs, or other musical instruments, the combination with a shell or casing, provided with a longitudinal opening or slot, perforated end pieces or caps, and a stem or spindle in said shell or casing having its ends rotatively arranged in the perforations of said end pieces or caps, of a perforated music sheet within said shell or casing, having its inner end secured to said stem or spindle, and having its forward end projecting from the longitudinal opening or slot in said shell or casing, and means at the forward end of said music sheet, adapted to be brought in holding engagement with a portion or portions of said shell or casing, substantially as and for the purposes set forth.

3. In an attachment for playing pianos, organs, or other musical instruments, the combination, with a shell or casing, provided with a longitudinal opening or slot, perforated end pieces or caps, and a stem or spindle in said shell or casing having its ends rotatively arranged in the perforations of said end pieces or caps, of a perforated music sheet within said shell or casing, having its inner end secured to said stem or spindle, and having its forward end projecting from the longitudinal opening or slot in said shell or casing, and means at the forward end of said music sheet, consisting, of a rod or bar around which the said end of the music sheet is secured, and projecting ends to said rod or bar adapted to be brought in holding engagement with portions of said shell or casing, substantially as and for the purposes set forth.

4. In an attachment for playing pianos, organs, or other musical instruments, the combination, with a shell or casing, provided with a longitudinal opening or slot, perforated end pieces or caps, and a stem or spindle in said shell or casing having its ends rotatively arranged in the perforations of said end pieces or caps, of a perforated music sheet within said shell or casing, having its inner end secured to said stem or spindle, and having its forward end projecting from the longitudinal opening or slot in said shell or casing, and means at the forward end of said music sheet, consisting, of a rod or bar around which the said end of the music sheet is secured, projecting ends on said rod or bar adapted to be brought in holding engagement with portions of said shell or casing, and a loop or finger piece on said rod or bar, substantially as and for the purposes set forth.

5. In an attachment for playing pianos, organs, or other musical instruments, the combination, with a shell or casing, provided with a longitudinal opening or slot, perforated end pieces or caps, a stem or spindle in said shell or casing having its ends rotatively arranged in the perforations of said end pieces or caps, and a cylindrical body on said stem, of a perforated music sheet within said shell or casing reeled upon said cylindrical body, the inner end of said music sheet being fixed to said cylindrical body, and said music sheet having its forward end projecting from the longitudinal opening or slot in the shell or casing, and means at the forward end of said music sheet, adapted to be brought in holding engagement with a portion or portions of said shell or casing, substantially as and for the purposes set forth.

6. In an attachment for playing pianos, organs, or other musical instruments, the combination, with a shell or casing, provided with a longitudinal opening or slot, perforated end pieces or caps, a stem or spindle in said shell or casing having its ends rotatively arranged in the perforations of said end pieces or caps, and a cylindrical body on said stem, of a perforated music sheet within said shell or casing reeled upon said cylindrical body, the inner end of said music sheet being fixed to said cylindrical body, and said music sheet having its forward end projecting from the longitudinal opening or slot in the shell or casing, and means at the forward end of said music sheet, consisting, of a rod or bar around which the said end of the music sheet is secured, and projecting ends to said rod or bar adapted to be brought in holding engagement with portions of said shell or casing, substantially as and for the purposes set forth.

7. In an attachment for playing pianos, organs, or other musical instruments, the combination, with a shell or casing, provided with a longitudinal opening or slot, perforated end pieces or caps, a stem or spindle in said shell or casing having its ends rotatively arranged in the perforations of said end pieces or caps, and a cylindrical body on said stem, of a perforated music sheet within said shell or casing reeled upon said cylindrical body, the inner end of said music sheet being fixed to said cylindrical body, and said music sheet having its forward end projecting from the longitudinal opening or slot in the shell or casing, and means at the forward end of said music sheet, consisting, of a rod or bar around which the said end of the music sheet is secured, projecting ends to said rod or bar adapted to be brought in holding engagement with portions of said shell or casing, and a loop or finger piece on said bar or rod, substantially as and for the purposes set forth.

8. The combination, with a pair of bearings having receiving sockets, and one of said bearings having a slot or opening, of a shell or casing, provided with a longitudinal opening, and end pieces or caps, a central roller in said shell or casing, a music sheet on said roller, and a stud or projection on one of said end pieces or caps extending into said slot or opening in one of said bearings, substantially as and for the purposes set forth.

9. The combination, with a pair of bearings having receiving sockets, and one of said bearings having a slot or opening, of a shell or casing, provided with a longitudinal opening, and perforated end pieces or caps, a cylindrical body in said shell or casing, provided with means for rotatively arranging said cylindrical body in the perforated end pieces or caps, a music sheet within said shell or casing, and a stud or projection on one of said end pieces or caps, extending into said slot or opening in one of said bearings, substantially as and for the purposes set forth.

10. The combination, with a receiving roll, having flanges at its ends and slots or cut away portions in said flanges, and said roll having a longitudinal groove 18, and an enlarged depression 19, of a music sheet adapted to be reeled upon said roll, and means at one end of said music sheet for attaching said sheet to said roll, consisting, essentially, of a rod or bar around which the said end of said sheet is secured, said rod and end of the sheet being arranged in said groove 18, a loop or finger piece on said rod or bar adapted to be arranged in said depression 19, and projecting ends on said rod or bar adapted to be removably arranged in the slotted or cut away portions in the flanges of said receiving roll, substantially as and for the purposes set forth.

11. In an attachment for playing pianos, organs, or other musical instruments, the combination, with a tubular shell or casing, and a cylindrical body in said shell or casing, having a longitudinal groove or slot, of a perforated music sheet in said shell or casing, and a stem or rod 42 around which one end of said music sheet is secured, said stem or rod 42 being arranged in the groove or slot of said cylindrical body, substantially as and for the purposes set forth.

12. In an attachment for playing pianos, organs, or other musical instruments, the combination, with a tubular shell or casing, and a cylindrical body in said shell or casing, having a longitudinal groove or slot, of a perforated music sheet in said shell or casing, a stem or rod 42 around which one end of said music sheet is secured, said stem or rod 42 being arranged in the groove or slot in said cylindrical body, and a rod or bar around which the forward end of the music sheet is secured, and projecting ends to said rod or bar adapted to be brought in holding engagement with portions of said shell or casing, substantially as and for the purposes set forth.

13. In an attachment for playing pianos, organs, or other musical instruments, the combination, with a tubular shell or casing, and a cylindrical body in said shell or casing, having a longitudinal groove or slot, of a perforated music sheet in said shell or casing, a stem or rod 42 around which one end of said music sheet is secured, said stem or rod 42 being arranged in the groove or slot in said cylindrical body, a rod or bar around which the forward end of the music sheet is secured, projecting ends to said rod or bar adapted to be brought in holding engagement with portions of said shell or casing, and a loop or finger piece on said rod or bar, substantially as and for the purposes set forth.

14. In an attachment for playing pianos, organs, or other musical instruments, the combination, with a carriage, and contact making fingers, of bearings in said carriage, one of said bearings having a slot 27, a roller detachably arranged in said bearings, a shell or casing on said roller, having recesses 53, and a stud 50 extending into said slot 27, a perforated music sheet on said roller, said shell or casing surrounding said sheet, and projections 52 on said music sheet, arranged to engage said recesses in said shell or casing and cause the turning of said bearing provided with the slot 27, substantially as and for the purposes set forth.

15. In an attachment for playing pianos, organs, or other musical instruments, the combination, with a carriage, and contact making fingers, of bearings in said carriage, one of said bearings having a slot 27, a roller detachably arranged in said bearings, a shell or casing on said roller, having recesses 53, and a stud 50 extending into said slot 27, a perforated music sheet on said roller, said shell or casing surrounding said sheet, projections 52 on said music sheet, arranged to engage said recesses in said shell or casing and cause the turning of the said bearing provided with the slot 27, a holding catch for holding or retaining said carriage in its held and operative position, and means connected with said bearing provided with said slot 27 for releasing said catch, substantially as and for the purposes set forth.

16. The combination with a shell or casing provided with a longitudinal opening or slot and means rotatably arranged in said shell or casing, of a perforated music sheet or roll on said means, said music sheet having its forward end projecting from the longitudinal opening or slot in said shell or casing, and means at the forward end of said music sheet adapted to be brought in holding engagement with a portion or portions of said shell or casing substantially as and for the purposes set forth.

17. As a new article of manufacture, a combined music roll and holder for use in self-playing musical instruments, formed of a core or roller, a music sheet wound on the roller, and a holder in which said roller is rotatably mounted and by which the music sheet is protected when wound on the roller, the roller having one end formed to operatively engage a rewinding driving device of the instrument while the roller is mounted in the holder.

18. As a new article of manufacture, a combined music roll and holder for use in self-playing musical instruments, formed of a core or roller, a music sheet wound on the roller, and a shell or casing forming a holder in which said roller is rotatably mounted and by which the music sheet is protected when wound on the roller, the roller having one end formed to operatively engage a rewinding driving device of the instrument while the roller is mounted in the holder.

19. As a new article of manufacture, a music roll for use in self playing musical instruments comprising a shell or casing having a longitudinal opening or slot, and a music sheet rolled up within said shell or casing and adapted to be unrolled and drawn out through the longitudinal opening or slot in the shell or casing.

20. As a new article of manufacture, a music roll for use in self playing musical instruments formed of a core or roller, a perforated music sheet formed of a continuous non-covered strip of flexible sheet metal wound on the roller, and a holder in which said roller is rotatably mounted.

21. As a new article of manufacture, a music roll for use in self playing musical instruments formed of a core or roller, a music sheet wound on the roller, and a holder in which said roller is rotatably mounted, the music sheet being provided at its outer end with means adapted to engage the holder for turning the holder when the sheet has been re-wound by the rotation of the roller.

22. As a new article of manufacture, a music roll for use in self playing musical instruments formed of a core or roller, a music sheet wound on the roller, and a shell or casing within which the roller is rotatably mounted and having a longitudinal opening or slot through which the music sheet may be drawn.

23. As a new article of manufacture, a music roll for use in self playing musical instruments formed of a core or roller, a music sheet wound on the roller, and a shell or casing within which the roller is rotatably mounted and having a longitudinal opening or slot through which the music sheet may be drawn, the music sheet being provided at its outer end with means adapted to engage the shell or casing for turning the shell or casing when the sheet has been re-wound by the rotation of the roller.

24. The combination with a series of circuit closers adapted to be controlled by a traveling music sheet, of a winding roller for the music sheet; a music roll formed of a core or roller, a music sheet wound on the core, and a holder in which said core is rotatably mounted, the music sheet being provided at its outer end with means adapted to engage the holder for turning the holder when the sheet has been rewound by the rotation of the core; and means for supporting the music roll and for rotating the core or roller of the music roll for rewinding the music sheet thereon, said means including a member adapted to turn with the holder of the music roll.

25. The combination with a series of circuit closers adapted to be controlled by a traveling music sheet, of a winding roller for the music sheet; a music roll formed of a core or roller, a music sheet wound on the core and a holder in which said core is rotatably mounted, the music sheet being provided at its outer end with means adapted to engage the holder for turning the holder when the sheet has been rewound by the rotation of the core; and bearings for the music roll, one of said bearings being connected to turn with the core or roller of the music roll, means for rotating said bearing for rewinding the music sheet, and the other of said bearings being connected with the holder of the music roll so as to be turned by the holder when the latter is turned by the music sheet.

26. The combination of a music roll formed of a core or roller, a music sheet wound on the roller, and a holder in which said roller is rotatably mounted, the music sheet being provided at its outer end with means adapted to engage the holder for turning the holder when the sheet has been rewound by the rotation of the roller; with a series of circuit closers adapted to be controlled by a traveling music sheet, a carriage in which the music roll is supported, means on the carriage through which the core or roller of the music roll is rotated for rewinding the music sheet, driving mechanism for actuating said means when the carriage is in operative position, a detent for holding the carriage in its operative position, and means controlled by the turning of the holder of the music roll for tripping the detent to release the carriage.

Witness my hand this 6th day of July, 1903.

TIMOTHY B. POWERS.

In presence of—

KATIE MCGUIRE,

TH. HUBERT.